UNITED STATES PATENT OFFICE 2,243,501

CEMENT MASS

Karl Daimler and Heinz Thron, Frankfort-on-the-Main, Germany, assignors, by mesne assignments, to Walther H. Duisberg, New York, N. Y.

No Drawing. Application June 7, 1935, Serial No. 25,506. In Germany June 16, 1934

7 Claims. (Cl. 106—24)

The present invention relates to cement masses which, when worked up with water, yield particularly waterproof concrete and for the treatment of which only relatively small quantities of water are required.

These advantages are attained by the addition of substances which increase the solubility in water of the cement and thus accelerate its mixing power. As substances which may be mixed with cement there may be used, according to our invention, water-soluble organic compounds containing at least 8 carbon atoms in the molecule, however no sulfo-group. The term "sulfo-group" is used herein to mean, as usual in chemical nomenclature, the group $SO_3H$ when it is directly linked to a carbon atom. As particularly useful there have been found such water-soluble organic compounds containing at least 8 carbon atoms in the molecule but no sulfo group as contain one or several hydroxyl groups. Compounds of this kind are, for instance, obtainable by transforming alcohols which as such are insoluble in water, for instance fat alcohols, into water-soluble compounds by the action of several molecules of ethylene oxide. Furthermore there belong to the substances to be used according to the invention for instance the water-soluble reaction products of several molecules of ethylene oxide or the homologues thereof on fatty acid, fatty acid amides, fatty acid glycerides, hydroxy fatty acids and the derivatives thereof, fat amines, phenols, naphthols, aromatic bases, amino-phenols and the like. Finally there may be used for instance the reaction products of fatty acids and kinds of sugar or sugar amines, furthermore fatty acid esters of poly-glycerin and the like.

As useful compounds there may be named polyhydroxyethylated wool fat alcohol, the sodium salt of abietic acid, hydroxyethylated sperm oil fatty acid, hydroxyethylated dodecyl alcohol, hydroxyethylated casein, polyhydroxyethl-oleyl alcohol, hydroxyethylated methylcyclohexanol, hydroxyethylated ricinoleic acid, hydroxyethylated xylenol, cresol-polyglycollic ether, stearylamine-polyglycollic ether and hydroxyethylated octodecyl-alcohol.

With the same advantage there may furthermore be used as additions to cement the derivatives of alcohols which are soluble in water not owing to the repeated hydroxyethylation of the alcohol, but owing to its transformation into the partial esters of polybasic acids. There may particularly be used the partial esters of sulfuric acid, of phosphoric acid, or phosphorous acid and of maleic acid. Useful compounds of this kind are especially the ester acids which are derived from fat alcohols of high molecular weight, for instance ammonium-dodecyl alcohol sulfate, stearyl alcohol-sodium sulfate, the sodium salt of isoheptyl phosphoric acid, the potassium salt of oleyl phosphoric acid, the sodium salt of dodecyl-phosphorous acid, the sodium salt of maleic acid-mono-isoheptyl ester, the phosphoric acid ester of coconut oil fatty acid ethanol amide or of the hydroxyethylated coconut oil fatty acid ethanol amide.

The quantitative proportions in which the additional substances may be mixed with the cement vary according to the molecular weight of the admixture; as a rule there is used a quantity of about 0.5 to about 2 per cent.

The following examples serve to illustrate the invention, but they are not intended to limit it thereto, the parts being by weight if not stated otherwise:

(1) When mixtures of concrete are prepared there is dissolved in the water used for mixing the cement polyhydroxy ethylated wool fat alcohol (with 20 ether groups neighboring the carbinol group) in a quantity of 2 per cent. of the cement to be used. By the addition of this solution to the mixture consisting of cement and the additional substances there is attained that a liquid magma of concrete is produced with the same quantity of water as is used for the preparation of rammed or compressed concrete. This liquid magma of concrete may for instance be used by pouring or it may be conveyed by means of a pump. For instance for 100 parts of Portland cement and 480 parts of river sand there are used 47 cc. of water which contain 2 grams of polyhydroxyethylated wool fat alcohol in the dissolved condition. By the additional substance described the consistency of the concrete is altered; the drawback of an increased addition of water is, however, avoided.

(2) The alcohol obtained by reduction from palm nut oil fatty acid is converted into the acid sulfo ester. The sodium salt of this sulfo ester is mixed in a finely pulverized form with cement in a ratio of 1:200; the mixture of concrete is then prepared in the usual manner with sand or gravel and water. 1 part of alcohol sulfonate, 200 parts of Portland cement, 960 parts of river sand and 93 parts of water are, for instance, used. While using the same quantity of water as has hitherto been required for the preparation of compressed concrete, a liquid magma of concrete is used owing to the addition of the liquefying substance. The concrete produced is suitable for casting and pouring or it may be conveyed by means of pumps from the mixing machine to the building place.

3. Xylenol-polyglycollic ether obtained by hydroxyethylation from xylenol is dissolved in quantities of 5 per mille—calculated upon the weight of the cement—in the water used for mixing the cement; the cement magma is then prepared in the usual manner. By the addition of xylenol-polyglycollic ether a change of the consistency of the cement mortar is attained in such a manner that a magma of concrete which otherwise is only plastic becomes capable of being poured or cast by the addition described; an increased addition of water is, however, not required. For instance 100 parts of Portland cement and 480 parts of river sand are mixed with 47 cc. of water which contain 0.5 gram of xylenol-polyglycollic ether in the dissolved condition.

We claim:

1. As a new composition of matter a mixture of cement and a water-soluble hydroxyethylated organic compound containing at least 8 carbon atoms and being free from sulfo groups.

2. As a new composition of matter a mixture of cement and a water-soluble hydroxyethylated organic compound containing at least 8 carbon atoms and at least one hydroxyl group and being free from sulfo groups.

3. As a new composition of matter a mixture of cement and a water-soluble compound containing at least 8 carbon atoms and obtained by the action of ethylene oxide on a water-insoluble alcohol.

4. As a new composition of matter a mixture of cement and a water-soluble polyhydroxyethylated wool fat alcohol.

5. As a new composition of matter a mixture of cement and a water-soluble xylenol-polyglycollic ether.

6. As a new composition of matter a mixture of cement and a water-soluble beta-naphthol-polyglycollic ether.

7. A composition of matter comprising a hydraulic cement and a small amount of an alkali salt of a fatty alcohol sulphate.

KARL DAIMLER.
HEINZ THRON.